US010257523B2

(12) United States Patent
Yang

(10) Patent No.: US 10,257,523 B2
(45) Date of Patent: Apr. 9, 2019

(54) ADAPTIVE DECODING SYSTEM

(71) Applicant: Avago Technologies International Sales Pte. Limited, Singapore (SG)

(72) Inventor: Zhijie Yang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 1683 days.

(21) Appl. No.: 13/715,418

(22) Filed: Dec. 14, 2012

(65) Prior Publication Data

US 2014/0169446 A1   Jun. 19, 2014

(51) Int. Cl.
| | |
|---|---|
| *H04N 19/70* | (2014.01) |
| *G06F 15/16* | (2006.01) |
| *H04B 1/66* | (2006.01) |
| *H04N 19/30* | (2014.01) |
| *H04N 19/44* | (2014.01) |
| *H04N 19/172* | (2014.01) |
| *H04N 19/132* | (2014.01) |
| *H04N 19/156* | (2014.01) |
| *H04N 19/31* | (2014.01) |

(52) U.S. Cl.
CPC ......... *H04N 19/172* (2014.11); *H04N 19/132* (2014.11); *H04N 19/156* (2014.11); *H04N 19/31* (2014.11); *H04N 19/44* (2014.11)

(58) Field of Classification Search
None
See application file for complete search history.

(56) References Cited

U.S. PATENT DOCUMENTS

| | | | | |
|---|---|---|---|---|
| 8,918,533 | B2* | 12/2014 | Chen et al. | 709/231 |
| 8,964,828 | B2* | 2/2015 | Raveendran | 375/240 |
| 2008/0068446 | A1* | 3/2008 | Barkley et al. | 348/14.07 |
| 2012/0183076 | A1* | 7/2012 | Boyce et al. | 375/240.25 |
| 2014/0161192 | A1* | 6/2014 | Sato | 375/240.16 |
| 2014/0301476 | A1* | 10/2014 | Deshpande | 375/240.25 |
| 2014/0301477 | A1* | 10/2014 | Deshpande | 375/240.25 |

* cited by examiner

*Primary Examiner* — Dave Czekaj
*Assistant Examiner* — Alison Slater
(74) *Attorney, Agent, or Firm* — Sterne, Kessler, Goldstein & Fox P.L.L.C.

(57) ABSTRACT

A method, system, and computer program product for adaptive decoding is provided herein. The method includes the steps of receiving a video bitstream, selecting an initial extraction level, and switching to a lower quality extraction level if a decoding rate is less than a rate at which data extracted from the video bitstream is sent to the decoder. The method further includes the step of switching to a higher quality extraction level if the decoding rate is greater than a rate at which data extracted from the video bitstream is to the decoder.

16 Claims, 7 Drawing Sheets

ADAPTIVE DECODING SYSTEM

BACKGROUND OF THE INVENTION

Field of the Invention

This application generally relates to an adaptive video decoding system.

Background Art

As video resolution increases, so to does the required memory bandwidth needed to decode the video. Current video resolutions are increasing from 1080p60 to 4k×2k×60, with 8k×4k×60 envisioned in the future. Current decoding systems are not able to adapt to the increased memory bandwidth requirements. Furthermore, video is displayed in a greater variety of formats such as Picture-In-Picture (PIP), Picture-By-Picture (PBP), mosaic mode etc., which requires adaptive decoding modes. However, current decoding systems are not able to adapt to the changing video resolution and video display formats.

Methods and systems are needed to overcome the above deficiencies.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 1 illustrates an example communication system.

FIG. 2 further illustrates a set-top box according to an embodiment of the disclosure.

Embodiments presented herein will now be described with reference to the accompanying drawings. In the drawings, like reference numbers may indicate identical or functionally similar elements.

DETAILED DESCRIPTION OF THE DISCLOSURE

Figure 1:
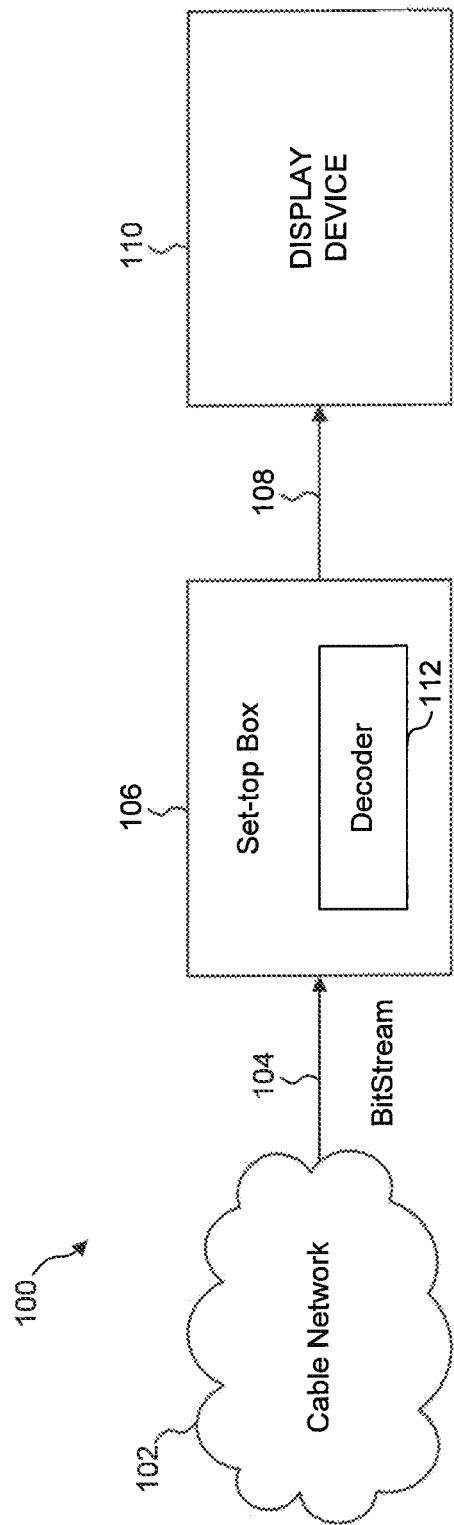

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

Example Definitions

Embodiments presented herein may be directed towards a High Efficiency Video Coding (HEVC) standard. Example definitions of terms used herein are provided below:

Network Abstraction Layer (NAL) unit: A syntax structure that includes an indication of a type of data to follow in a video bitstream. It also includes data in the form of a raw byte sequence payload (RBSP) interspersed, if necessary, with emulation prevention bytes. Typically, data received in a HEVC bitstream is in the form of NAL units. A NAL unit has data to indicate a number of temporal sub-layers in a HEVC video stream.

nal_unit_type specifies a type of RBSP data structure included in a NAL unit.

Random Access Point (RAP) picture: A coded picture for which each slice segment has a nal_unit_type in a range of 7 to 12 inclusive.

Video coding layer (VCL) NAL unit: A collective term for coded slice segment NAL units and the subset of NAL units that have reserved values of nal_unit_type.

Sub-layer: A temporal scalable layer of a temporal scalable bitstream that includes VCL NAL units with a particular value of a temporal identification (ID) variable, and the associated non-VCL NAL units. The temporal ID indicates how many temporal sub-layers are present in a bitstream or how many temporal sub-layers are to be extracted from the bitstream.

Temporal sub-layer: A temporal scalable layer of a temporal scalable bitstream consisting of VCL NAL units with a particular temporal ID and the associated non-VCL NAL units.

Temporal Sub-layer Access (TSA) NAL unit: A NAL unit in which the coded picture is a TSA picture. A TSA NAL unit allows for an increase in temporal sub-layer extraction bypassing the need for a stepwise increase in temporal sub-layer extraction. For example, if a current temporal ID is 2, a TSA NAL unit allows for a direct switch to a temporal ID of 4 thereby bypassing the need for a stepwise increase to temporal ID 3 followed by temporal ID 4.

Stepwise Temporal Sub-layer Access (STSA) NAL unit: A NAL unit in which the coded picture is an STSA picture. A STSA NAL unit requires a stepwise increase in temporal sub-layer extraction. For example, if a current temporal ID is 2, a STSA NAL unit requires a switch to a temporal ID of 3 before it can switch to a temporal ID of 4.

The HEVC standard is described along with some of the terms used herein in the HEVC specification titled "High Efficiency Video Coding (HEVC) text specification draft 9" which is incorporated by reference herein in its entirety. An "Overview of the High Efficiency Video Coding (HEVC) Standard" is also incorporated by reference herein in its entirety.

Description

FIG. 1 illustrates an example system 100 according to an embodiment. System 100 includes a cable network 102 coupled to a set-top box 106. Set-top box (STB) 106 is coupled to a display device 110.

Set-top box 106, also referred to as a set-top unit (STU), is a device that generally includes a tuner and is coupled to a display device 110 and an external source of signal such as a cable network 106 that provides a source signal. Set-top box 106 converts the source signal into a form that can be displayed on display device 110. Set-top boxes can also enhance source signal quality. Set-top boxes are used in cable systems such as Data Over Cable Service Interface Specification (DOCSIS) along with satellite television systems. According to an embodiment, cable network 102 may be any type of cable network or may also include any kind of data source such as a Blu-ray or Digital Video Disk (DVD) player or any other source of video that can output a video bitstream ("bitstream") 104. In an example, the bitstream 104 includes a High Efficiency Video Coding (HEVC) bitstream. Set-top box 106 includes a decoder 112 that decodes the bitstream and outputs references to decoded frames 108 for display on display device 110. En an example, the decoder 112 is an HEVC decoder. Display device 110 may be any type of display device, including but not limited to, high definition television (HDTV) systems, computer monitors, personal digital assistants (PDAs), or media players such as iPads™, iPods™, or wireless telephonic devices such as the iPhone™.

As described above, as video resolution increases, so too does the required memory needed to decode the video. Current video resolutions are increasing from 1080p60 to 4k×2k×60, with 8k×4k×60 envisioned in the future. Current decoding systems are not able to adapt to the increased memory bandwidth requirements. Furthermore, video is displayed in a greater variety of formats such as Picture-In-Picture (PIP), Picture-By-Picture (PBP), mosaic mode etc. which requires adaptive decoding. However, current decoding systems are not able to adapt to the changing video resolution, video display formats and decoding rates supported by a decoder 112. For example, decoder 112 may not be able to decode at fast enough rates to support a HEVC bitstream. Furthermore, there may not be a memory that is large enough or fast enough to support decoding a high resolution bitstream. In such cases, a system must take into account display parameters used by display device 110 in combination with a rate at which decoder 112 is able to decode data. For example, if display resolution is high (e.g. 1080p60), and decoder 112 cannot decode fast enough, then fewer frames need to be extracted and sent to decoder 112. This will allow the decoder 112 to keep up with the rate at which frames are sent to it for decoding and reduce the required memory bandwidth as well. Alternatively, if decoder 112 can decode at a higher decoding rate than a current decoding rate and there is sufficient memory and/or memory bandwidth available, then, for example, more frames can be extracted and sent to decoder 112. Thus, a system is needed that can adapt to take into account display parameters and supportable decoding rates. Embodiments presented herein provide such solutions.

Figure 2:
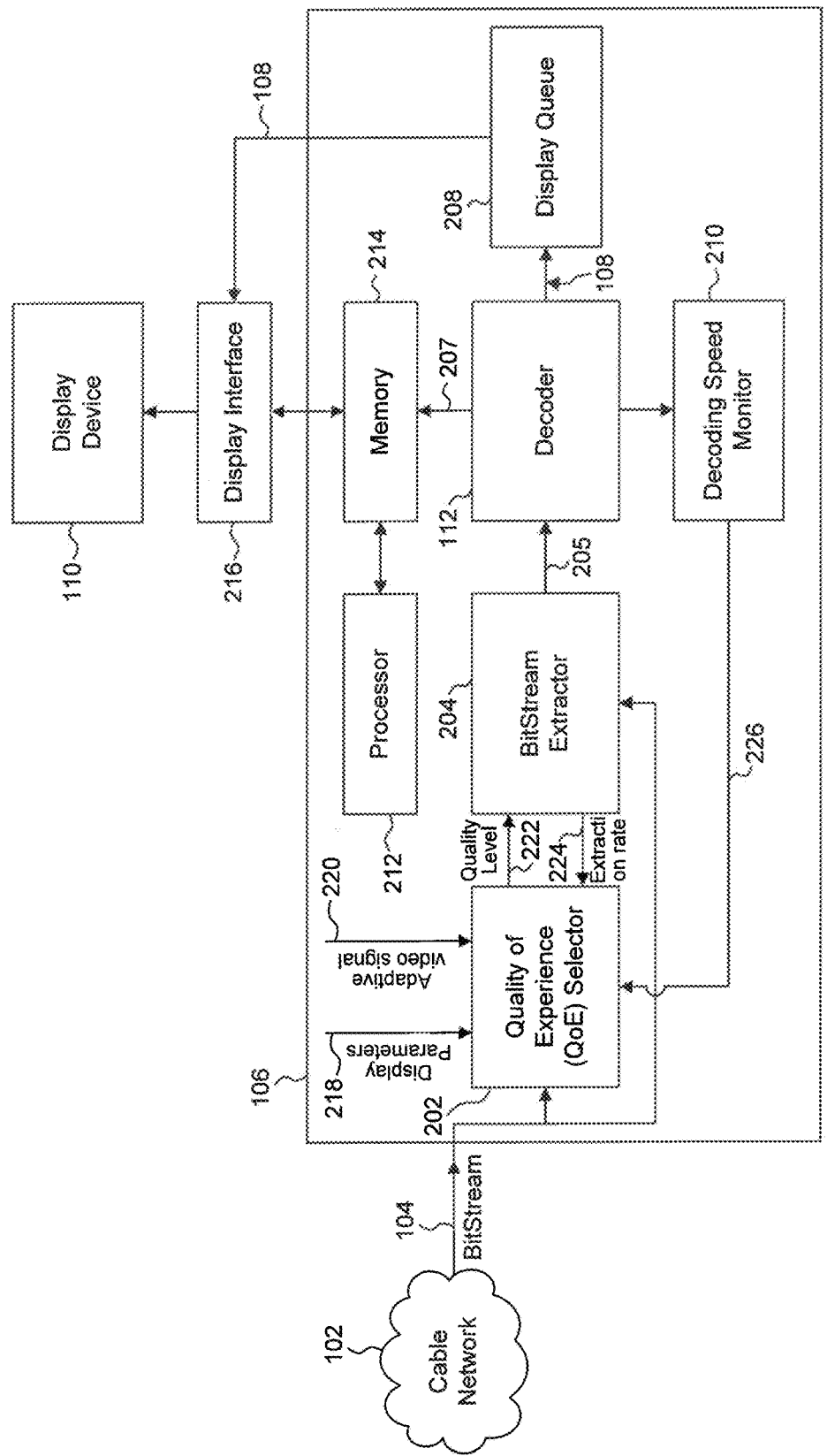

FIG. 2 further illustrates set-top box 106 according to an embodiment of the disclosure.

According to an embodiment, set-top box 106 includes a bitstream extractor 204, a quality of experience (QoE) selector 202, decoder 112, decoding speed monitor 210, processor 212, memory 214, and display queue 208.

Set-top box 106 is coupled to cable network 102. Set-top box 106 receives bitstream 104 from cable network 102. Set-top box 106 is also coupled to display device 110 via display interface 216. Display interface 216 may be, for example, a High-Definition Multimedia Interface (HDMI) interface. Display interface 216 receives references 108 to decoded frames from display queue 208. References 108 are "pointers" that indicate locations of decoded frames stored in memory 214. Using references 108, display interface 216 retrieves corresponding decoded frames 207 stored in memory 214. The decoded frames are then displayed on display device 110.

Bitstream extractor 204 extracts data including one or more of temporal sub-layer reference frames, non-reference frames, and random access point (RAP) pictures from bitstream 104 to generate extracted data 205. Decoder 112 is coupled to bitstream extractor 204 and decodes extracted data 205 to create decoded frames 207 that are stored in memory 214. References 108 to decoded frames 207 are stored in display queue 208 for output to display interface 216. The actual decoded frames are stored in memory 214.

Decoding speed monitor 210 determines a decoding rate at which decoder 112 decodes data extracted by bitstream extractor 204. The decoding rate 226 is typically measured in frames per second (fps) and indicated by decoding rate signal 226.

The quality of experience selector 202 is coupled to the decoding speed monitor 210 and the bitstream extractor 204. QoE selector 202 may set an initial quality extraction level for the bitstream extractor 204 via quality level signal 222. Extraction quality level as described herein, determines a number of temporal sub-layers to be discarded or preserved, whether non-reference frames are to be discarded or preserved, the number of frames per second to be extracted, and whether only random access point pictures (RAP) are to be extracted from bitstream 104 by bitstream extractor 204. Table 1 below illustrates an example extraction quality levels and the corresponding temporal identification (ID), whether non-reference frames for the corresponding temporal ID are to be discarded or preserved for the extracted temporal sub-layers, whether only RAP pictures are to be extracted, and the number of frames per second to be extracted from a bitstream 104.

TABLE 1

| Quality Level | Highest Temporal ID | Discard non-reference frame | RAP only | Frames per second |
|---|---|---|---|---|
| 0 | not applicable | not applicable | Yes | 1 |
| 1 | 0 | Yes | not applicable | 3.75 |
| 2 | 0 | No | not applicable | 7.5 |
| 3 | 1 | Yes | not applicable | 11.25 |
| 4 | 1 | No | not applicable | 15 |
| 5 | 2 | Yes | not applicable | 22.5 |
| 6 | 2 | No | not applicable | 30 |
| 7 | 3 | Yes | not applicable | 45 |
| 8 | 3 | No | not applicable | 60 |

A HEVC bitstream has many temporal sub-layers. The lower temporal layers are independent of the higher temporal sub-layers. The temporal ID indicates how many temporal sub-layers are to be extracted from bitstream 104. Two quality levels may have the same temporal ID but differ in other respects. For example in table 1 above, quality level 5 and 6 both have temporal ID 2. Therefore, only temporal layers 0-2 need to be preserved for both quality level 5 and 6. Temporal layer 3 may be discarded for both quality levels 5 and 6. However, in quality level 5, non-reference frames are discarded and the frame rate for extraction is 22.5 frames per second. In contrast, for quality level 6, non-reference frames are not discarded and the frame rate for extraction is 30 frames per second.

The initial quality extraction level may be based on one or more display parameters 218. Display parameters 218 include, but are not limited to, one or more of a display window size of display device 110, a format of bitstream 104, and a display mode in use by display device 110. A display window size is typically a number of horizontal and vertical pixels available for display on display device 110. The format of the video bitstream is one or more of the number of horizontal lines of pixels and a number of frames per second. The display mode may be, including but not limited to, transcoding, picture-in-picture (PIP), mosaic, or picture-by-picture (PBP). Table 2 below illustrates examples of extraction quality levels based on display parameters 218.

TABLE 2

| Display Window Size | Original Video Format | Display Mode | Initial Quality Level |
|---|---|---|---|
| 1920 × 1080 | 1080p60 | Transcoding | 6 |
| 352 × 288 | 1080p60 | PIP | 4 |
| 352 × 288 | 1080p60 | Mosaic Mode | 2 |
| 1920 × 1080 | 1080p30 | Transcoding | 8 |
| 352 × 288 | 1080p30 | PIP | 6 |
| 352 × 288 | 1080p30 | Mosaic Mode | 4 |

In the example above in table 2, for a display window size 352×288, original video format 1080p60 and a display mode of PIP, the initial quality level is set at 4. According to table 1 above, quality level 4 corresponds to a temporal ID of 1, i.e. only temporal layers 0-1 are extracted from bitstream 104 and temporal layers 2-3 are discarded. Quality level 4 also requires discarding non-reference frames and extracting 15 frames per second from bitstream 104.

According to an embodiment, QoE selector 202 adjusts the extraction level quality of bitstream extractor 204 based on a comparison of the decoding rate as indicated by decoding speed monitor 210 and a rate at which the bitstream extractor 204 sends extracted data 205 to the decoder 112 that is indicated by extraction rate 224 in frames per second. The quality of experience selector 202 receives the display window size, original video format and display mode as shown in table 2 via signal 218. The quality of experience selector QOE 202 determines whether adaptive video extraction is to take place based on adaptive video extraction signal 220. If adaptive video extraction signal 220 indicates that adaptive extraction is enabled then quality of experience selector 202 sets the quality level at which bitstream extractor 204 extracts data from bitstream 104 using quality level signal 222. If adaptive video extraction signal 220 indicates that adaptive extraction is disabled, then QoE selector sets a default quality level at which bitstream extractor 204 extracts data from bitstream 104 using quality level signal 222.

In an example, QOE selector 202 switches bitstream extractor 204 to a lower quality extraction level if a decoding rate indicated by signal 226 is less than a rate, indicated by signal 224, at which the bitstream extractor 204 sends extracted data 205 from bitstream 104 to HEVC decoder 112. In response to a lower quality extraction level indicated by quality level signal 222, bitstream extractor 204 extracts from bitstream 104, one or more of, a lower number of frames per second, discards non-reference frames for a particular temporal sub-layer, or discards one or more temporal sub-layers that were previously extracted at a previous extraction level. Typically, when switching down to a lower quality extraction level, non-reference frames that were preserved for a particular temporal ID are now discarded. By lowering the extraction level quality, less extracted data 205 is sent to decoder 112. Decoder 112 can now support a rate at which bitstream extractor 204 sends extracted data 205 to decoder 112.

QOE selector 202 is also configured to switch bitstream extractor 204 to a higher quality extraction level if a decoding rate indicated by signal 226 of decoder 112 is higher than a rate at which bitstream extractor sends extracted data 205, as indicated by signal 224, to decoder 112. In response to a higher quality extraction level, as indicated by quality level signal 222, bitstream extractor 204 extracts from bitstream 104, one or more of, a higher number of frames per second, one or more previously discarded temporal sub-layers, or previously discarded non-reference frames for a particular temporal sub-layer at a current extraction level. Typically, when switching up to a higher quality extraction level, non-reference frames that were previously discarded for a particular temporal ID are now preserved. By increasing the extraction level quality, more extracted data 205 is sent to decoder 112. Decoder 112 can now decode at a higher rate and hence provide a higher quality data feed to display 110.

Example functions performed by QoE selector 202 are further described below with reference to flowchart 300 in FIG. 3. Example functions performed by bitstream extractor 204 based on quality level signal 222 are further described below with respect to FIGS. 4A-C.

Figure 3:
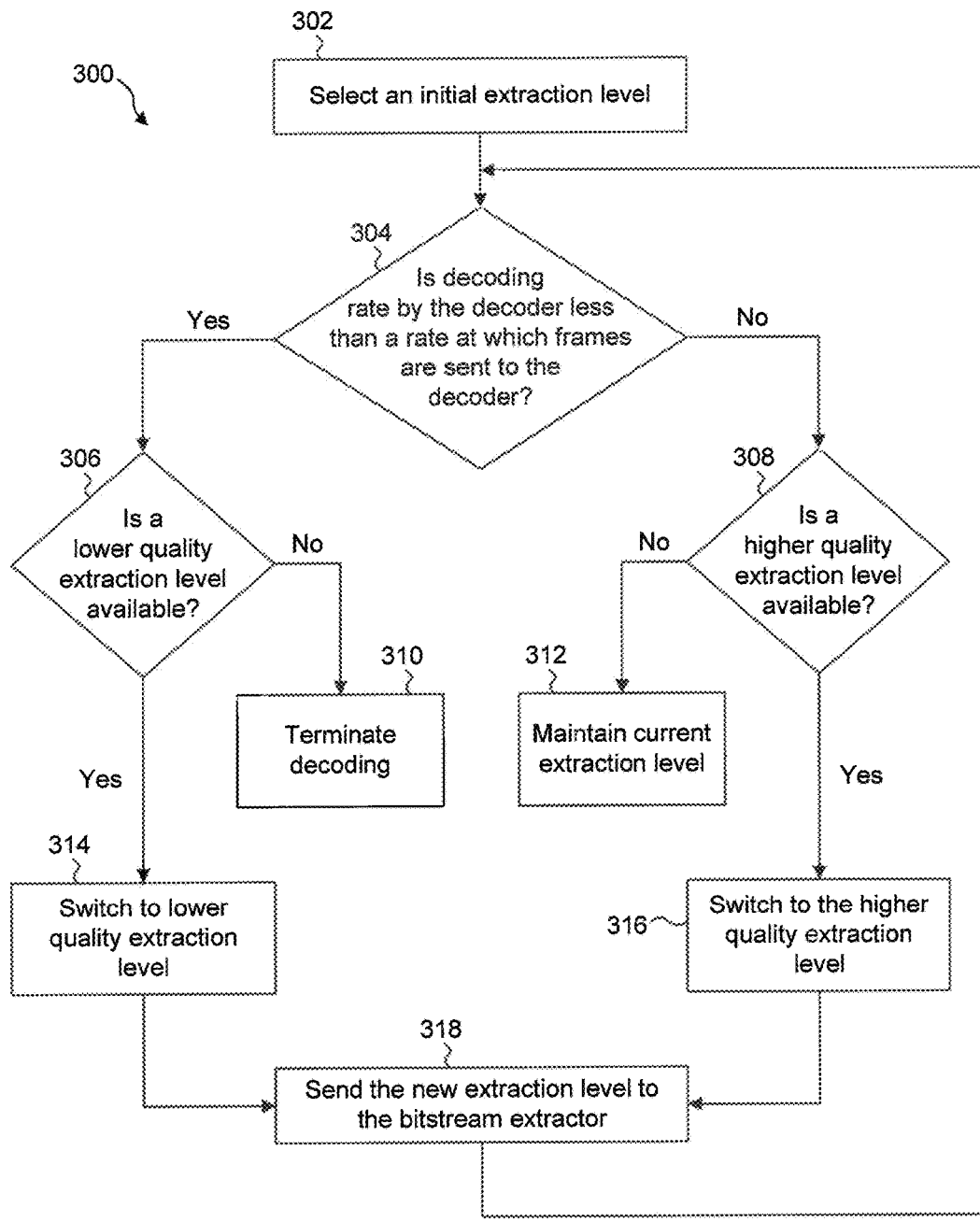
FIG. 3 illustrates an example flowchart illustrating steps performed by a Quality of Experience (QoE) selector according to an embodiment of the disclosure.

FIG. 3 illustrates an example flowchart 300 illustrating steps performed by QoE selector 202 according to an embodiment of the disclosure. Flowchart 300 will be described with continued reference to the example operating environment depicted in FIGS. 1-2. However, the process is not limited to these embodiments. Note that some steps shown in flowchart 300 do not necessarily have to occur in the order shown. In an example, the steps are performed by processor 212 are based on instructions stored in memory 214.

In step 302, an initial extraction level is selected. For example, QoE selector 202 based on one or more of display window size, format of the video bitstream, and display mode, selects an initial extraction level from table 2 above.

In step 304, it is determined whether a decoding rate of a decoder is less than a rate at which frames are sent to the decoder. For example, QoE selector 202 determines whether a decoding rate by decoder 112, as indicated by decoding rate signal 226, is less than a rate at which frames are sent to decoder 112 by bitstream extractor 204 as indicated by extraction rate signal 224. If the decoding rate is lesser, then the process proceeds to step 306. If the decoding rate is greater, then the process proceeds to step 308.

In step 306, it is determined whether a lower quality extraction level is available. For example, QoE selector based on table 1 above determines whether a lower quality extraction level than the current quality level is available. If a lower quality extraction level is not available then the process proceeds to step 310. If a lower quality extraction level is available, then the process proceeds to step 314.

In step 310, decoding is terminated. For example, QoE selector 202 may signal decoder 112 to terminate decoding if a lower quality decoding level is not available and possibly display a message on display device 110 indicating that the bitstream 104 cannot be displayed.

In step 314, a lower quality extraction level is selected. For example, QoE selector 202 sends quality level signal 222 to bitstream extractor 204 to switch to a lower quality extraction level. The process proceeds to step 318.

In step 308, it is determined whether a higher quality extraction level is available. If a higher quality extraction level is not available, then the process proceeds to step 312. If a higher quality extraction level is available, then the process proceeds to step 316.

In step 312, a current extraction level is maintained. For example, QoE selector 202 sends quality level signal 222 to bitstream extractor 204 to maintain a current extraction level.

In step 316, a higher quality extraction level is switched to. For example, quality of experience selector 202 sends quality level signal 222 to bitstream extractor 204 to switch to a higher quality extraction level. In an example, availability of the higher quality extraction level is determined using table 1 above. The process proceeds to step 318.

In step 318, the new extraction level is sent to the bitstream extractor. For example, the new extraction level is sent to bitstream extractor 204. The process then goes back to step 304.

Figure 4A:
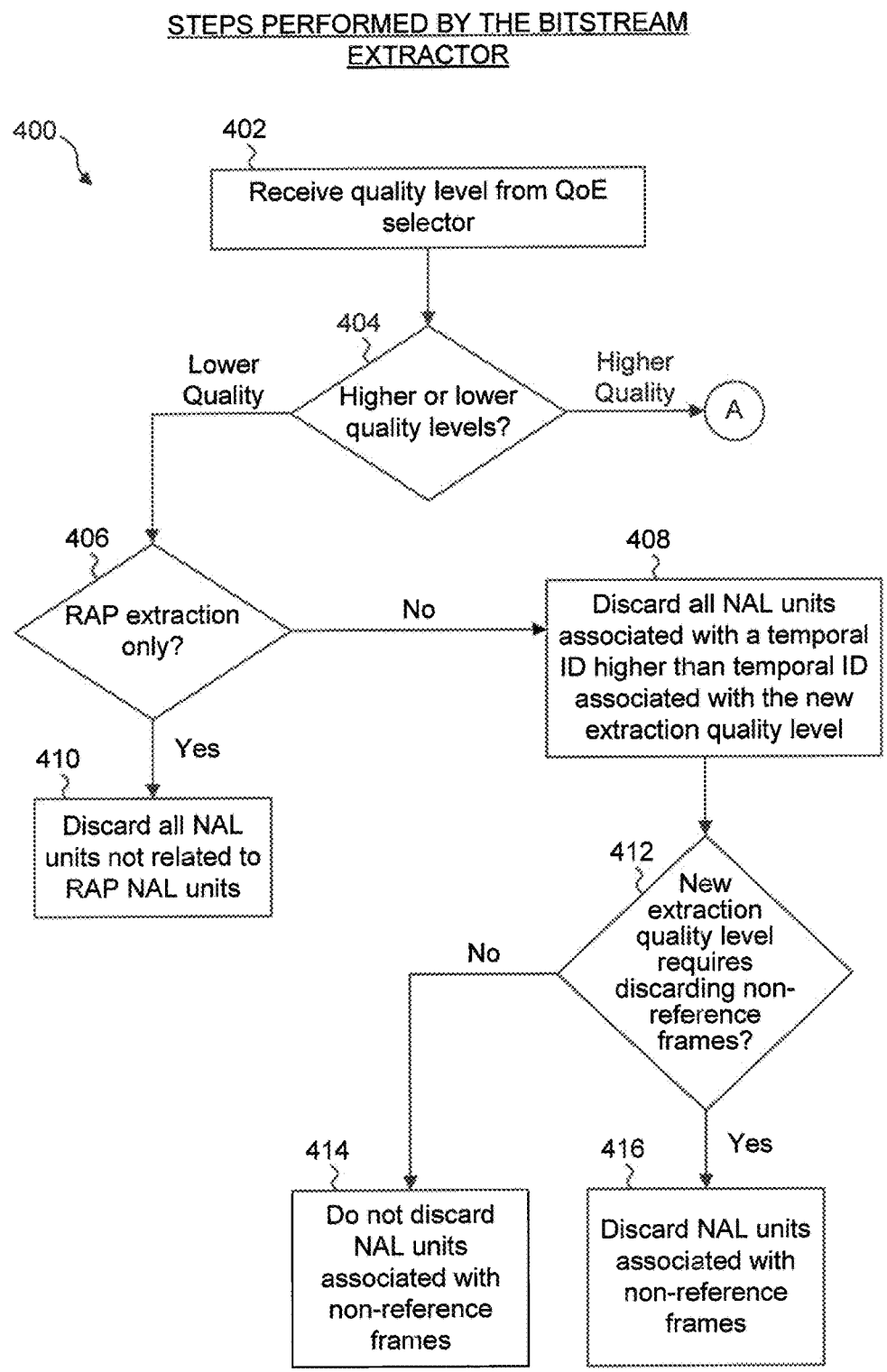
FIG. 4A illustrates an example flowchart illustrating steps performed by a bitstream extractor according to an embodiment of the disclosure.

FIG. 4A illustrates an example flowchart 400 illustrating steps performed by bitstream extractor 204 according to an embodiment. Flowchart 400 will be described with continued reference to the example operating environment depicted in FIGS. 1-2. However, the process is not limited to these embodiments. Note that some steps shown in flowchart 400 do not necessarily have to occur in the order shown. In an example, the steps are performed by processor 212 are based on instructions stored in memory 214.

In step 402, a quality level is received. For example, QoE selector 202 sends quality level signal 222 to bitstream extractor 204 indicating the extraction level quality.

In step 404, it is determined whether the extraction quality level received in step 402 is higher or lower than a current extraction quality level. If the extraction level is lower than the current extraction quality level, then the process proceeds to step 406. If the extraction quality level is higher than the current extraction quality level, then the process proceeds to flowchart 417 in FIG. 4B.

In step 406, it is determined whether the quality level indicates RAP picture extraction only. For example, bitstream extractor 204 determines whether quality level signal 222 indicates RAP picture extraction only. As seen in table 1 above, the lowest extraction quality level is RAP picture extraction only. At this quality level, bitstream extractor 204 extracts only RAP pictures from bitstream 104. If the quality level indicated by quality of experience selector 202 does not indicate RAP extraction only, then the process proceeds to step 408. If the quality level indicates RAP extraction only, then the process proceeds to step 410.

In step 410, all network abstraction layer (NAL) units not related to RAP NAL units are discarded. For example, bitstream extractor 204 discards all NAL units in bitstream 104 that are not related to RAP NAL units. In other words, bitstream extractor 204 only extracts RAP NAL units and sends them to decoder 112.

In step 408, all NAL units associated with a temporal ID higher than the temporal ID associated with the extraction quality level determined in step 314 of flowchart 300 are discarded. For example, bitstream extractor 204 discards all NAL units in bitstream 104 that are associated with a temporal ID higher than the temporal ID associated with the extraction quality level indicated by quality level signal 222 in step 314.

In step 412, it is determined whether the new extraction quality level requires discarding non-reference frames. If the new extraction quality level requires discarding non-reference frames then the process proceeds to step 416. If the new quality level does not require discarding non-reference frames then, the process proceeds to step 414.

In step 414, NAL units associated with non-reference frames are not discarded. For example, bitstream extractor 204 preserves NAL units in bitstream 104 that are associated with non-reference frames.

In step 416, NAL units associated with non-reference frames are discarded. For example, bitstream extractor 204 discards NAL units associated with non-reference frames in bitstream 104.

Figure 4B:
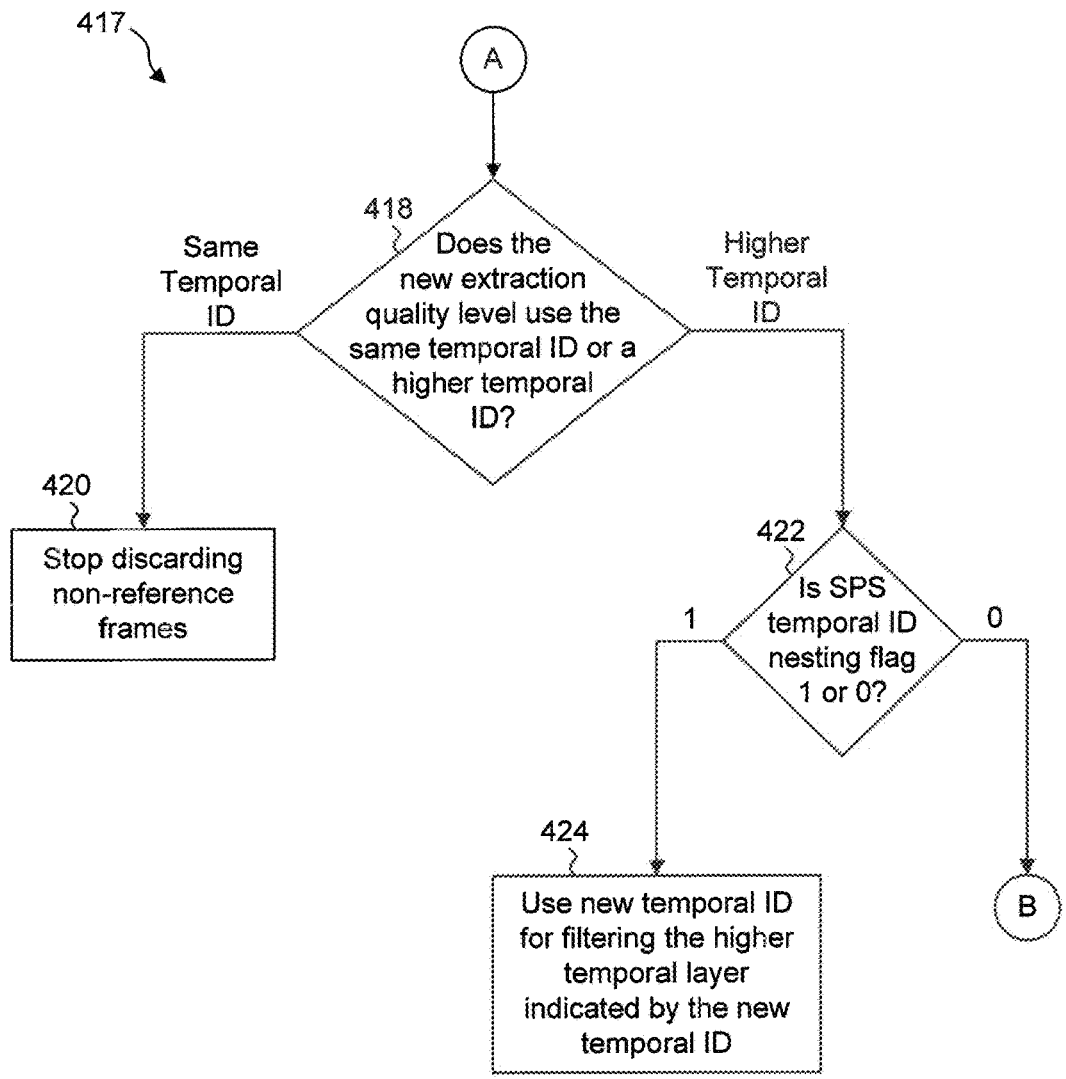
FIG. 4B illustrates an example flowchart illustrating steps performed by a bitstream extractor when switching to a higher quality extraction level according to an embodiment of the disclosure.

FIG. 4B illustrates an example flowchart 417 illustrating steps performed by bitstream extractor 204 when switching to a higher quality extraction level according to an embodiment of the disclosure. Flowchart 417 will be described with continued reference to the example operating environments depicted in FIGS. 1-2. However, the process is not limited to these embodiments. Note that some steps shown in flowchart 417 do not necessarily have to occur in the order shown. In an example, the steps are performed by processor 212 are based on instructions stored in memory 214.

In step 418, it is determined whether the new extraction quality level uses the same temporal ID or a higher temporal ID than the current extraction level. For example, bitstream extractor 204 determines whether the extraction quality level indicated by quality level signal 222 in step 314 uses the same temporal ID or a higher temporal ID than the current extraction level by examining table 1 above. If the new extraction quality level uses the same temporal ID, then the process proceeds to step 420. If the new extraction quality level uses a higher temporal ID then the process proceeds to step 422.

In step 420, non-reference frames are not discarded. For example, bitstream extractor 204 stops discarding non-reference frames in bitstream 104.

In step 422, it is determined whether a SPS temporal ID nesting flag ("sps_temporal_id_nesting_flag") is 1 or 0. In the HEVC standard, sps_temporal_id_nesting_flag is a parameter stored in a NAL unit. For example, bitstream extractor 204 determines whether a SPS temporal ID nesting flag in a NAL unit received from bitstream 104 is 1 or 0. If the sps_temporal_id_nesting_flag is 1, then the process proceeds to step 424. If the sps_temporal_id_nesting_flag is 0, then the process proceeds to flowchart 426 in FIG. 4C.

In step 424, the new temporal ID is used for filtering. For example, bitstream extractor 204 uses the higher temporal layer indicated by the new temporal ID for filtering bitstream 104.

Figure 4C:
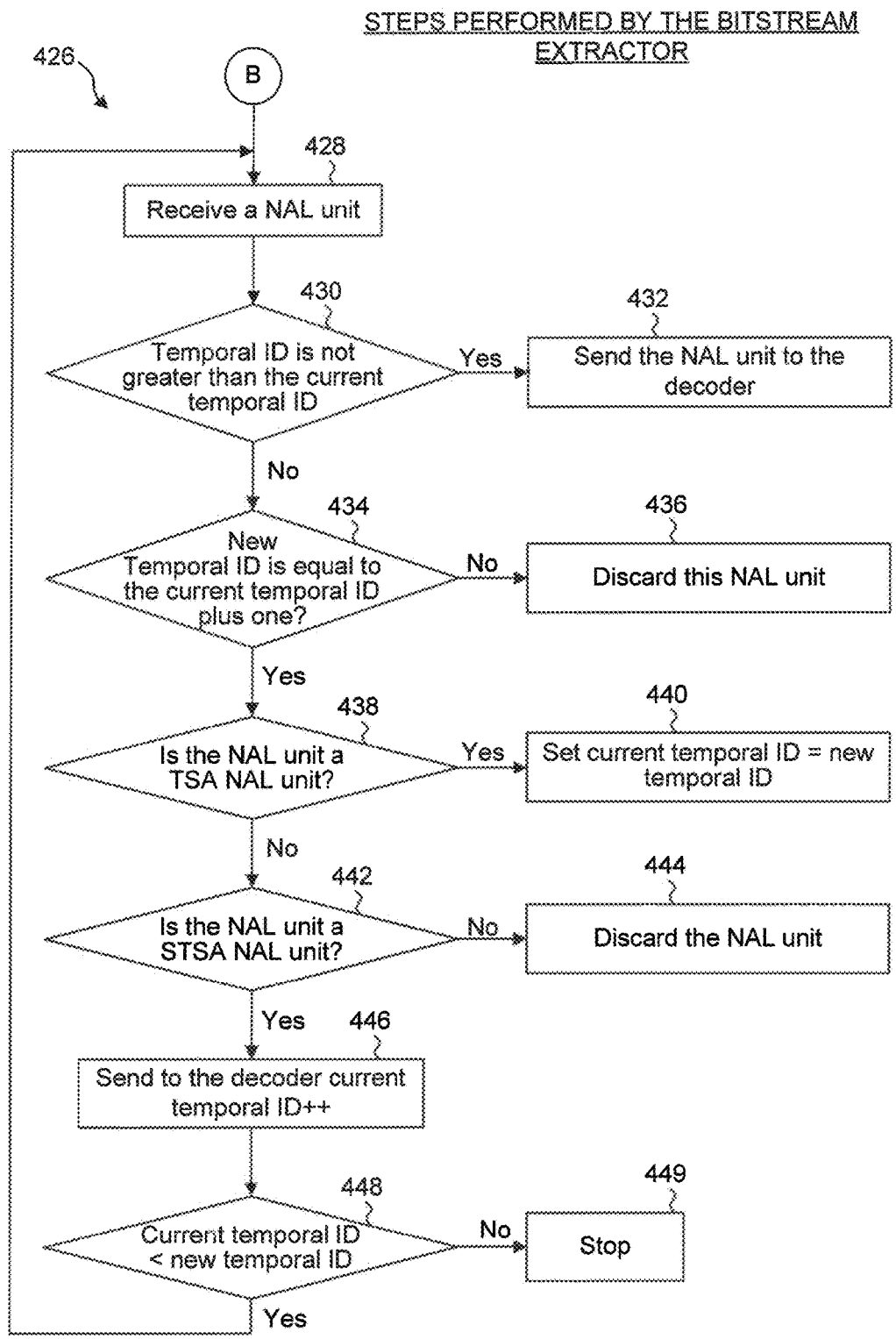
FIG. 4C illustrates an example flowchart illustrating steps performed by a bitstream extractor when switching to a higher quality extraction level and when a SPS temporal ID nesting flag is 0 according to an embodiment of the disclosure.

FIG. 4C illustrates an example flowchart 426 illustrating steps performed by bitstream extractor 204 when switching to a higher quality extraction level and when a SPS temporal ID nesting flag is 0 according to an embodiment of the disclosure. Flowchart 426 will be described with continued reference to the example operating environments depicted in FIGS. 1-2. However, the process is not limited to these embodiments. Note that some steps shown in flowchart 426 do not necessarily have to occur in the order shown. In an example, the steps are performed by processor 212 are based on instructions stored in memory 214.

In step 428, a NAL unit is received. For example, bitstream extractor 204 receives a NAL unit from bitstream 104.

In step 430, it is determined whether the new temporal ID is not greater than the current temporal ID. For example, if the new temporal ID based on quality level signal 222 is not greater than a current temporal ID, then the process proceeds to step 432. If the new temporal ID is greater than the current temporal ID, then the process proceeds to step 434.

In step 432, the NAL unit is sent to the decoder. For example, the NAL unit from step 428 is sent by bitstream extractor 208 to decoder 112 in extracted data 205.

In step 434, it is determined whether the new temporal ID is greater than or equal to the current temporal ID plus one. For example, in step 434, bitstream extractor 204 determines whether the new temporal ID indicated by quality level signal 222 is greater than or equal to the current temporal ID plus one. If the new temporal ID is greater than or equal to the current temporal ID plus one, then the process proceeds to step 438. If the new temporal ID is not greater than or equal to the current temporal ID plus one, then the process proceeds to step 436.

In step 436, the NAL unit received in step 428 is discarded. For example, bitstream extractor 204 discards the NAL unit received in step 428.

In step 438, it is determined whether the NAL unit received in step 428 is a TSA NAL unit. If the NAL unit is a TSA NAL unit, then the process proceeds to step 440. If the NAL unit is not a TSA NAL unit, then the process proceeds to step 442.

In step 440, the current temporal ID is set to the new temporal ID. For example, bitstream extractor 204 sets the new temporal ID as the current temporal ID.

In step 442, it is determined whether the NAL unit received in step 428 is a STSA NAL unit. If the NAL unit is a STSA NAL unit, then the process proceeds to step 446. If the NAL unit is not a STSA NAL unit, then the process proceeds to step 444.

In step 444 the NAL unit is discarded. For example, bitstream extractor 204 discards the NAL unit received in step 428.

in step 446, the current temporal ID is incremented by one. For example, bitstream extractor 204 increments the current temporal ID by one.

In step 448, it is determined whether the current temporal ID incremented in step 446 is still less than the new temporal ID indicated by quality level signal 222. For example, in step 448, bitstream extractor 204 determines whether the current temporal ID incremented in step 446 is still less than the new temporal ID based on quality level signal 222. If the current temporal ID is still less than the new temporal ID, then the process proceeds to step 428 for a step wise increase in the temporal ID. If the current temporal ID is equal to the new temporal ID, then the process stops in step 449.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 5:
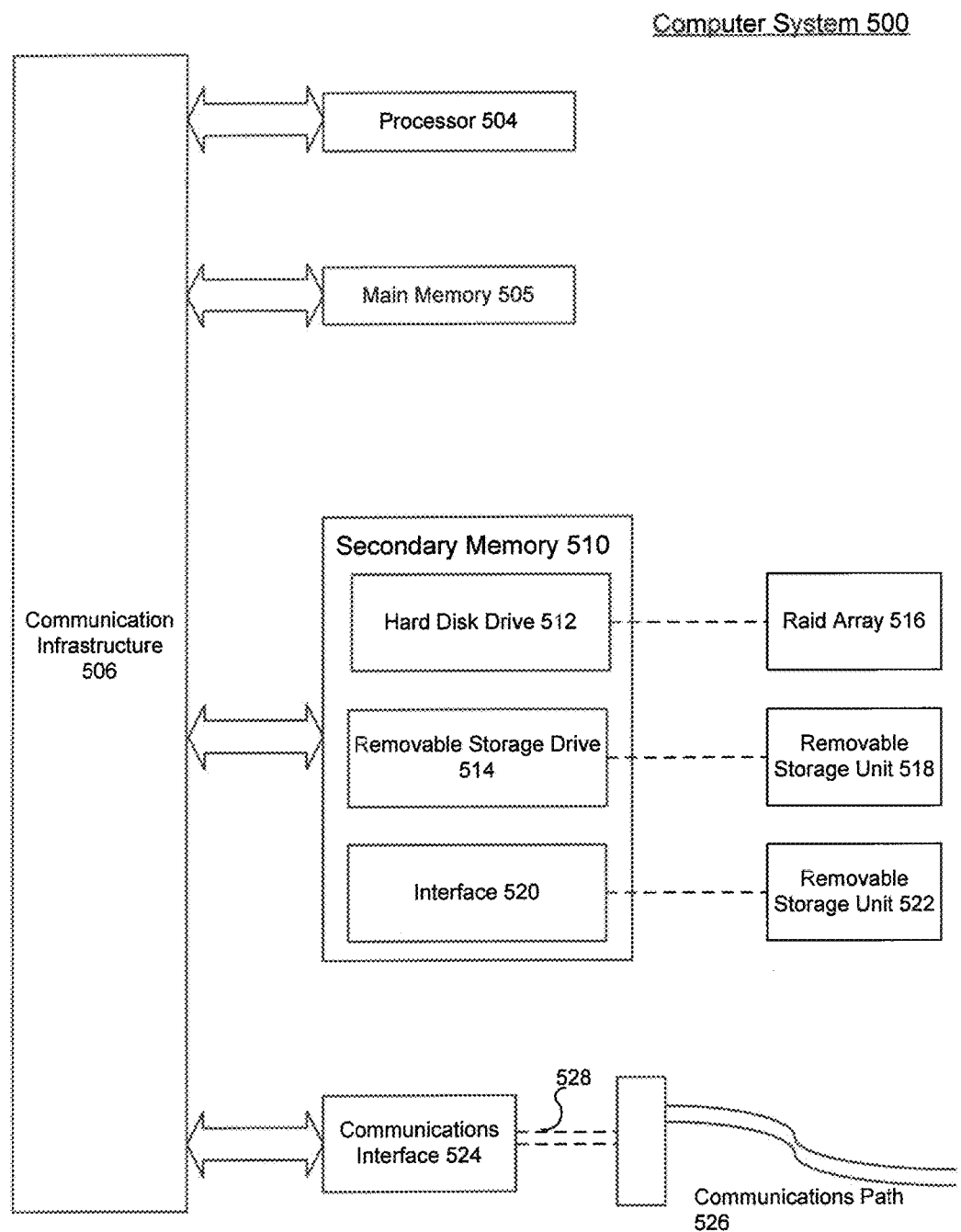
FIG. 5 is a block diagram of an exemplary computer system on which embodiments presented herein can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 5. The computer system 500 includes one or more processors, such as processor 504. Processor 504 can be a special purpose or a general purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the disclosure using other computer systems and/or computer architectures.

Computer system 500 also includes a main memory 505, preferably random access memory (RAM), and may also include a secondary memory 510. The secondary memory 510 may include, for example, a hard disk drive 512, and/or a RAID array 516, and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc. As will be appreciated, the removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCM-CIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path 526. Communications path 526 carries signals 528 and may be implemented using wire or cable, fiber optics, a phone line, a cellular phone link, an RF link and other communications channels.

The terms "computer program medium" and "computer usable medium" are used herein to generally refer to media such as removable storage drive 514, a hard disk installed in hard disk drive 512, and signals 528. These computer program products are means for providing software to computer system 500.

Computer programs (also called computer control logic) are stored in main memory 505 and/or secondary memory 510. Computer programs may also be received via communications interface 524. Such computer programs, when executed, enable the computer system 500 to implement the present disclosure as discussed herein. In particular, the computer programs, when executed, enable the processor 504 to implement the processes of the present disclosure. For example, when executed, the computer programs enable processor 504 to implement part of or all of the steps described above with reference to the flowcharts herein. Where the disclosure is implemented using software, the software may be stored in a computer program product and loaded into computer system 500 using raid array 516, removable storage drive 514, hard drive 512 or communications interface 524.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

Conclusion

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. An adaptive decoding system, comprising:
   a bitstream extractor configured to extract data including one or more of temporal sub-layers, reference frames, non-reference frames, or Random Access Point (RAP) pictures from a video bitstream;
   a decoder coupled to the bitstream extractor and configured to decode the data extracted by the bitstream extractor;
   a decoding speed monitor configured to determine a decoding rate at which the decoder decodes the data extracted by the bitstream extractor; and
   a quality of experience (QoE) selector coupled to the decoding speed monitor and the bitstream extractor and configured to adjust an extraction quality level of the bitstream extractor based on a comparison of the decoding rate and a rate at which the bitstream extractor sends the data to the decoder.

2. The system of claim 1, wherein an initial extraction quality level is based on one or more of a display window size, format of the video bitstream, or display mode.

3. The system of claim 1, wherein the QoE selector is configured to switch the bitstream extractor to a lower extraction quality level when the decoding rate is less than the rate at which the bitstream extractor sends the data to the decoder.

4. The system of claim 1, wherein the QoE selector is configured to switch the bitstream extractor to a higher extraction quality level when the decoding rate is higher than the rate at which the bitstream extractor sends the data to the decoder.

5. The system of claim 1, wherein the extraction quality level determines a number of temporal sub-layers to be discarded, whether non-reference frames are to be discarded, the number of frames per second to be decoded, and whether only random access point pictures are to be decoded.

6. The system of claim 1, wherein the decoding rate and the rate at which the bitstream extractor sends the data to the decoder are measured in frames per second.

7. The system of claim 3, wherein the bitstream extractor, in response to the lower extraction quality level, is configured to extract one or more of a lower number of frames per second than a previous extraction quality level, discard non-reference frames for a particular temporal sub-layer, or discard one or more temporal sub-layers that were previously extracted at a previous extraction quality level.

8. The system of claim 4, wherein the bitstream extractor, in response to the higher extraction quality level, is configured to extract one or more of a greater number of frames per second than a previous extraction quality level, preserve one or more previously discarded temporal sub-layers or preserve previously discarded non-reference frames for a particular temporal sub-layer.

9. The system of claim 3, wherein the bitstream extractor, in response to the lower extraction quality level, is configured to determine whether the lower extraction quality level includes only RAP picture extraction.

10. The system of claim 9, wherein the bitstream extractor is configured to:
    discard all Network Abstraction Layer (NAL) units that are not related to RAP NAL units when the lower extraction quality level includes only RAP picture extraction.

11. The system of claim 3, wherein the bitstream extractor, in response to the lower extraction quality level, is configured to:
    discard all Network Abstraction Layer (NAL) units associated with a current temporal sub-layer that is higher than a temporal sub-layer associated with the lower quality extraction quality level when the lower extraction quality level does not require only RAP picture decoding;
    determine whether the lower extraction quality level requires discarding non-reference frames;
    discard NAL units associated with non-reference frames when the lower extraction quality level requires discarding non-reference frames; and
    preserve NAL units associated with non-reference frames when the lower extraction quality level does not require discarding non-reference frames.

12. The system of claim 4, wherein the bitstream extractor, in response to the higher extraction quality level, is configured to:
    determine whether the higher extraction quality level uses a higher temporal identification than a previous extraction quality level and to stop discarding non-reference frames when the higher extraction quality level uses the same temporal identification as the previous extraction quality level.

13. The system of claim 12, further wherein the bitstream extractor, in response to the higher extraction quality level, is configured to:
    extract a higher temporal layer when:
        the higher extraction quality level uses the higher temporal identification than the previous extraction quality level and when a Sequence Parameter Set (SPS) temporal identification (ID) nesting flag is true.

14. The system of claim 4, wherein the bitstream extractor, in response to the higher extraction quality level, is configured to:
   determine whether a Sequence Parameter Set (SPS) temporal identification (ID) nesting flag is false; and when the SPS temporal ID nesting flag is false:
      receive a Network Abstraction Layer (NAL) unit;
      send the NAL unit to the decoder when a new temporal ID is not greater than a current temporal ID;
      discard the NAL unit when the new temporal ID is not equal to the current temporal ID plus one;
      discard the NAL unit when it is neither a Temporal Sub-layer Access (TSA) NAL unit nor a Step-wise Temporal Sub-layer Access (STSA) unit;
   set the new temporal ID as the current temporal ID when the NAL unit is the TSA NAL unit;
      set the current temporal ID as the current temporal ID plus one when the NAL unit is the STSA NAL unit; and
      repeat the determine, receive, send, discard, and set until the current temporal ID is equal to the new temporal ID and extract data from the video bitstream based on the new temporal ID.

15. The system of claim 2, wherein the format of the video bitstream is one or more of a number of horizontal lines of pixels and a number of frames per second.

16. The system of claim 2, wherein the display mode is one of transcoding, picture in picture (PIP), mosaic, or picture by picture (PBP).

* * * * *